United States Patent [19]

Shaw

[11] Patent Number: 4,571,883
[45] Date of Patent: Feb. 25, 1986

[54] PLANT POT DRAIN
[76] Inventor: Roy Shaw, 34 Elizabeth St., Caldwell, N.J. 07006
[21] Appl. No.: 624,798
[22] Filed: Jun. 26, 1984

Related U.S. Application Data

[63] Continuation-in-part of Ser. No. 525,330, Aug. 22, 1983, which is a continuation-in-part of Ser. No. 410,341, Aug. 23, 1982, abandoned.

[51] Int. Cl.$^4$ .............................................. A01G 9/02
[52] U.S. Cl. ........................................................ 47/66
[58] Field of Search ................. 47/66, 79, 80, 71, 78, 47/39; 4/293, 292, 295, 286–291; 210/232, 308, 460, 314

[56] References Cited

U.S. PATENT DOCUMENTS

| | | | |
|---|---|---|---|
| 611,523 | 9/1898 | Springer | 47/66 |
| 3,758,987 | 9/1973 | Crane | 47/80 |
| 4,329,814 | 5/1982 | Blicha | 47/79 |

FOREIGN PATENT DOCUMENTS

| | | | |
|---|---|---|---|
| 187563 | 6/1907 | Fed. Rep. of Germany | 47/66 |

*Primary Examiner*—Robert A. Hafer
*Assistant Examiner*—Danton D. DeMille
*Attorney, Agent, or Firm*—Laughlin & Markensohn

[57] ABSTRACT

A drainage device for a plant pot or receptacle wherein said drainage device is set into the drainhole located at the center of the base of said plant pot, said drain device becoming integral with the pot, wherein the drainage device allows fluid to seep horizontally into the drainage device and, thereafter, drain out of pot thereby preventing fluid from accumulating within the pot. The device is comprised of a perforated cylinder with hemispherical top, a disc perpendicular and attached to the exterior of the cylinder, and an imperforate cylinder below the disc.

6 Claims, 12 Drawing Figures

FIG. 6
FIG. 7
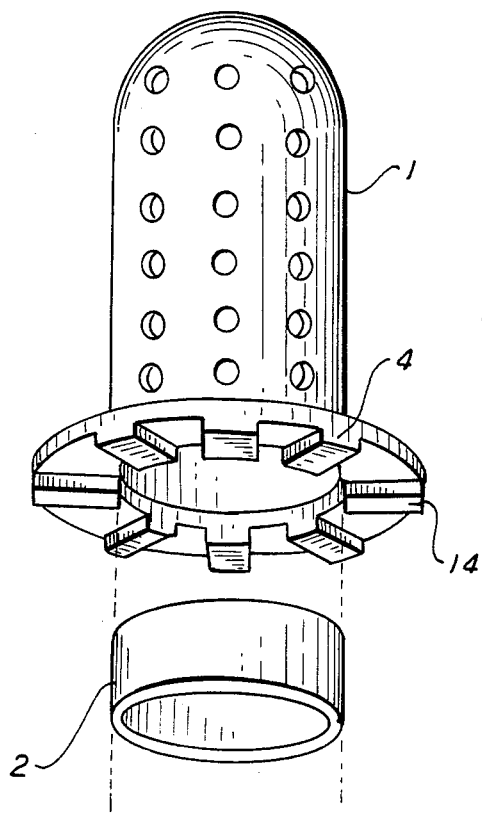
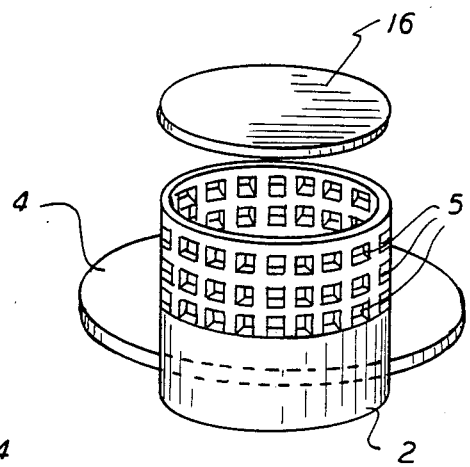
FIG. 8
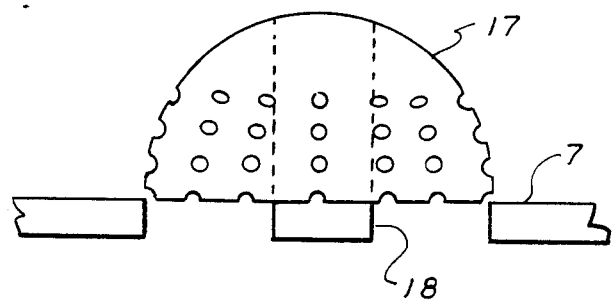
FIG. 9
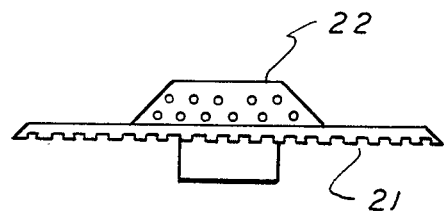

PLANT POT DRAIN

BACKGROUND OF THE INVENTION

This application is a continuation-in-part of patent application Ser. No. 525,330 filed Aug. 22, 1983 which in turn was a continuation-in-part of patent application Ser. No. 410,341 filed Aug. 23, 1982, now abandoned and also was preceded by Disclosure Document No. 109236.

House plants are usually kept in pots or receptacles made of clay or plastic. Such pots are provided with a central drainage hole in their base since proper drainage is important for pot bound plants. The drainage hole is for the purpose of allowing excess water or moisture in the soil to seep out of the pot through the hole.

When first potting a plant, most sources recommend placing a piece of broken crockery, or a few stones over the drain hole in the bottom of the pot which prevents loss of the soil or potting medium through the hole.

Data compiled from the research information available and from practical experience show that the materials and methods used to insure proper drainage and prevent soil loss have obvious shortcomings. First of all, most of the materials required to begin plant cultivation in containers, intended to be grown indoors, can generally be purchased from a single source, such as a garden supply center. With the increased popularity of house plants, grocery stores and variety stores now often have a garden section on their premises. The plants, pots, and the soil can all be purchased from one store. Unfortunately, there is presently no single exacting article of manufacture currently available which can insure the proper drainage and prevent soil loss due to the erosional effects of water from inexpensive pots. The materials described above used to serve this purpose i.e. a shard, broken crockery or a few stones, although seemingly common in nature are often times difficult to obtain. Broken crockery, obtained by design is an expensive method of acquiring the appropriate material. Given such materials not designed for the specific way in which they are used, they can become dislodged leading to soil loss necessitating repotting or, worse, they can clog the drain aperture in which case the results can be fatal to the plant. In the case of stones or pebbles which, unless purchased, are generally gathered locally from an outside source such as the yard, these materials are somewhat suspect. As with soil from the outside, care must be taken to insure that disease or pests are not introduced into the planting medium, thereby affecting the well-being of the plant. Commercially produced soils packaged in polyethylene bags for sale at garden centers have been sterilized, which eliminates fungus diseases that often fell seedlings and young plants raised from cuttings. The stones, pebbles, and/or broken crockery can be sterilized at home with commercial formalin (40 percent formaldehyde) or by baking in the oven. Since the formalin is poisonous, and baking difficult to control, the two methods can be quite impractical in the confines of one's home.

Plants have four basic requirements for growth: light, air, water and soil. This invention relates to the last three, air, soil and water. Part of the regimen in plant care is the necessary maintenance required to insure proper plant growth. Of the basics, consistent watering can be crucial. Proper watering is achieved by thoroughly saturating the soil by top watering after which the excess water should seep out through the drainage hole at the bottom. For most plants, after watering the soil should be allowed to dry out to some degree before watering again. This drying enables air to get to the roots with its needed oxygen. If the drain aperture becomes clogged, over-watering can quickly occur. This over-watering fills the porous spaces of the soil with water instead of air and thus prevents the roots of the plant from getting the oxygen they need for proper growth. This damages the root system of the plant and causes the roots to rot and this ultimately destroys the plant.

As the volume of the soil medium contained in most house plant containers is rather small, the repeated top waterings over a prolonged period of time can cause a significant portion of the soil to be transported from the plant pot. As running water is one of the most effective agents of erosion, its effects are somewhat exaggerated in the confines of the house plant container. The water used to irrigate the plant acts as a vehicle which transports or carries fine particles of clay and silt down through the soil medium where the particles are either carried out through the drain aperture or are deposited around the drain opening. Plants in containers having a drain hole in their base are usually kept in a tray or saucer which retains the excess water. It is in the tray or saucer that one can observe the transported soil. It would seem that the materials used to prevent this loss are ineffectual.

Various plant pots have been described in the prior art. U.S. Pat. No. 1,996,898 issued Apr. 9, 1975 to R. E. Brandell relates to the use of a metal mesh sleeve folded on itself to form a ball. The metal ball is placed over the central aperture in the base of the plant pot to prevent the roots of the plant from clogging the central aperture. Brandell teaches no mechanism to keep the metal ball centered while the soil medium is being placed in the pot.

French Pat. No. 2,461,449 issued to Cuvillier shows inserts placed in a tank of water. These inserts are used for simple on-off control of water level in the tank and do not promote seepage of water from the soil mass. U.S. Pat. No. 2,834,153 issued May 13, 1958 to W. H. C. Fearn discloses four raised feet or "nodes" in the base of the pot which will greatly increase the flow of soil from the plant pot. U.S. Pat. No. 4,092,803 issued June 6, 1978 to Thomas H. Naylor discloses an apparatus for self watering of plants. It has a flat top cap which is not integral with the cylinder and is not readily removable. The Naylor apparatus, like Cuvillier, functions in a fluid, not a soil, medium.

U.S. Pat. No. 3,987,584 issued Oct. 26, 1976 to Bernard Yellin shows a plastic domed cavity that is integrally molded into the base of a flower pot. The purpose of the cavity is to provide fertilizer to the plant. The cavity does not allow for drainage. Drainage, in this apparatus, is provided by apertures in the pot base which are exterior to the fertilizing cavity.

British Pat. No. 10,694 (4/1895) of Wootton shows a metal disc made of a perforated sheet metal that is pressed into a shallow convex "cup". The cup is inverted on the base of the pot to promote drainage. There is no way provided to center the apparatus over the central drain hole of the pot. The Wootton unit is designed to lie or rest in a horizontal position over the drain aperture of the plant receptacle. Since this position would bring the greatest portion of the drain into contact with the soil medium on a horizontal plane, water introduced into the pot would continually flush soil particles through the units drain apertures which would then evacuate the pot through the drain aperture.

OBJECTS OF THE INVENTION

An object of the invention is to provide a plant pot drain which facilitates insertion into the drainage hole in the bottom of a pot and maintains a proper position within the pot.

Another object of the invention is to provide a plant pot drain which reduces soil erosion.

Further objects and the advantage of the invention will be apparent from the following detailed description.

SUMMARY OF THE INVENTION

This invention relates to an improved plant pot drain specifically designed for and intended for use in combination with plant pots which have an open hole in their base which functions as a drainhole and soil or potting medium. The plant pot drain is inserted into the drain hole and retained in place by a horizontal flange and the pressure of the potting medium. The plant pot drain provides a channel through which water can drain from the soil medium contained in the plant pot or receptacle. The plant pot drain comprises a cylindrical main body having a hollow internal chamber, preferably formed of tubing which is open at the lower end and closed at its upper end. The uppermost portion or top of the tubing is closed by a solid, flat or hemispherical member. At a predetermined distance from the base of the cylindrical main body is an outwardly radially expanding disc or flange perpendicular to the tubular member and horizontal to the bottom of the plant pot in which it is used. Above the disc a plurality of small perforations or holes are disposed in a grid-like pattern around the main body to allow passage of water from the exterior to the hollow chamber. The perforations are small enough to prevent any substantial amount of soil from passing through the perforations with the water. The walls of the main body or tubing extend downward beneath the disc to the base and are imperforate. The perforations in the upper portion of the plant pot drain allow the water used to irrigate the plant to drain from the soil medium contained in the pot or receptacle through the drain hole. The disc or flange around the lower portion prevents the plant pot drain from slipping through the drain aperture in the base of the pot while providing an area on which the soil medium can rest and, under the weight of the soil, prevents the plant pot drain from being dislodged. The end or sleeve of the main body or tubing which is disposed beneath the disc is of such a circumference to allow insertion into the drain hole of the pot or receptacle. The sleeve in conjunction with the disc or flange insures the proper seating for the plant pot drain. Since the whole unit is hollow and the lower end is open, the plant pot drain channels the drain water out through the drain hole of the pot. The lower portion or sleeve does not extend beyond the existing profile of the exterior or bottom surface of the pot or receptacle.

The plant pot drain provides drainage while preventing excessive soil loss due to the erosional effects of water, prevents the drain aperture in the plant pot or receptacle from becoming clogged, provides a certain degree of aeration to the root system of the plant, and provides a channel which collects the water used to irrigate the plant and, under gravity, permeates down through the soil directing it out through the drain hole.

One of the most important features of the plant pot drain is that it effectively prevents soil loss due to its design configuration. This eliminates the need for a stone ballast in the pot or receptacle which reduces the overall weight of the planter. As a gravel base is unnecessary more soil can be used efficiently by the plant. The increased soil medium; (1) allows for a larger rootball, (2) the plant can remain longer in a planter before being transplanted, (3) and the gas exchange between root system and growing medium is increased promoting healthy plant growth.

BRIEF DESCRIPTION OF DRAWINGS

FIG. 6 is an exploded view of another embodiment of the invention.

FIG. 7 is a perspective view of another embodiment of the invention.

FIG. 8 is a front elevation showing another embodiment of the invention.

FIG. 9 is a front elevation showing another embodiment of the invention.

DETAILED DESCRIPTION OF THE INVENTION

Figure 1:
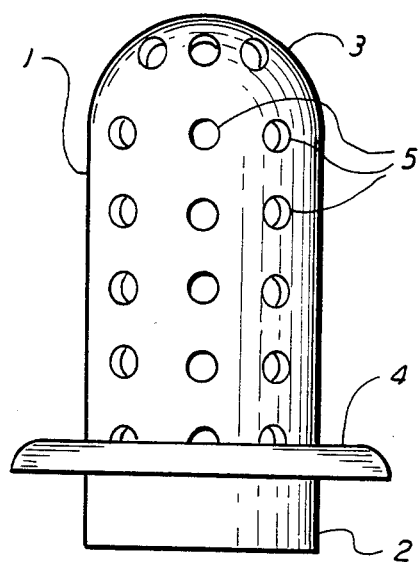
FIG. 1 is a front elevation view showing one embodiment of the invention with a hemispherical member enclosing top and imperforate base with a flat circular sleeve.

The plant pot drain was designed specifically to be inserted into the circular drain hole of a clay, wooden, plastic, or similar plant pot or planter. The elements of the plant pot drain are a radially expanding disc member, a imperforate tubular member which descends downwards to the horizontally disposed circumferential edge or base and an open bottom to allow water to flow out of the plant pot in which the plant pot drain is utilized. These elements are utilized in consideration of the plant pots presently on the market which have a central drain hole disposed in the base for drainage. The use of this invention is an excellent male/female union between the circular drain aperture and the lower portion of the plant pot drain. The coupling is achieved when the plant pot drain is inserted into the drain aperture.

The main body of the plant pot drain is preferably cylindrical, though other shapes can be used. The sleeve or washer-like disc provided around the main body is perpendicular to the cylinder walls and located near the lower end of the main body. The purpose of this sleeve is to prevent the main body from sliding through the drain hole, and also allow for closing off the portion of the drain hole which is not enclosed in the main body. The lower portion of the main body extends from the sleeve the distance of the drain hole so that the bottom of the main body is flush with the outside of the base of the pot.

The relationship between the various receptacles and the size of their component drain apertures is determined so that the unit would function properly with the widest possible number of plant receptacles, therefore reducing the need for a multiplicity of sizes. The diameter of the disc allows the sealing of the larger clay pot hole. It is preferred therefore to have a main body having a diameter in the range of one-eighth to one-half inch and a sleeve of one to two inches in diameter. This size accommodates 75% of the currently available clay pots. Depending on the manufacturer, pots with a top opening of 6" have a drain aperture opening of $\frac{5}{8}$" or $\frac{3}{4}$", in the smaller size pots the aperture size graduates in increments of $\frac{1}{8}$" starting at $\frac{1}{4}$", $\frac{3}{8}$", $\frac{1}{2}$" etc. At $\frac{5}{8}$" and $\frac{3}{4}$" they remain constant up through the larger size pots.

The lower portion of the tubular member is solid and imperforate and beneath the sleeve or disc. This portion of the plant pot drain is to be inserted into the drain hole and should be no thicker than the thickness of the base of the pot. Because of this configuration, the resting position of the pot is not disturbed. Further, the plant pot drain's internal nesting position is also not disturbed, and water disposed within the pot flows unimpeded into the perforated upper portion of the main body into the main body and out through the open end of the main body.

The plant pot drains function is two-fold: (1) it provides a permenent channel allowing water to drain from the pot, and (2) it prevents soil loss due to the errosional effects of water.

The plant pot drain, rather than simply lying over the base of the plant pot and covering the hole, instead has a mechanism to ensure its central position is maintained. When the plant pot drain is inserted into the drain aperture, it remains securely in position with the force of the soil and virtually integral with the pot.

Figure 2:
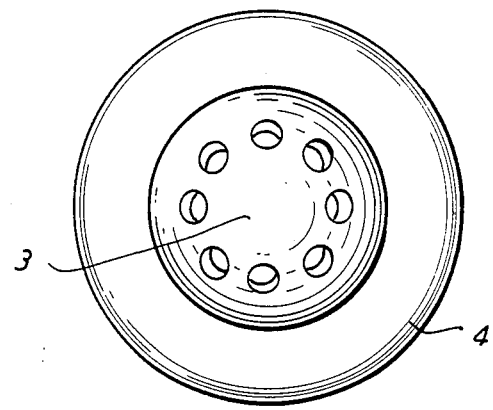
FIG. 2 is a top view of the plant pot drain shown in FIG. 1.
Figure 3:
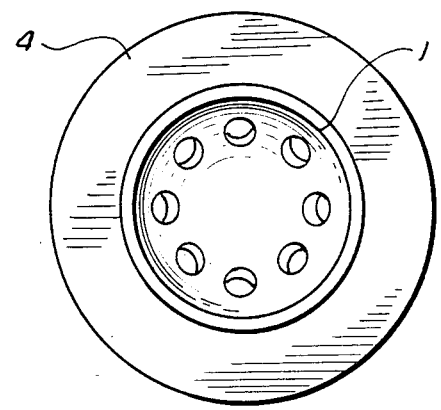
FIG. 3 is a bottom view of the plant pot drain shown in FIG. 1.

The invention as shown in FIGS. 1, 2 and 3 have a tubular member 1 consisting of a circumferentially continuous wall enclosing a hollow chamber and which extends upwardly from its lower open end 2, to its upper portion where the side walls converge and enclose the uppermost end or top into a solid hemispherical shape 3. It is a feature of this invention that this top is solid so the soil pressing down on it will assist holding it in place and also will not be carried into the internal hollow chamber. At a predetermined distance from the base, a radially outwardly expanding disc or flange 4, which can be integral with the tubular member 1, is disposed against the cylindrical wall. The disc 4 is disposed axially along the perpendicular to the tubular member 1 so that it will be parallel and in contact with the inside bottom of the pot. The vertical surface of the cylinder wall extending upward from the disc 4 is provided with a plurality of small circular apertures or perforations 5. The perforation can be of any shape such as a round or rectangular. The perforations extend from the exterior of the cylinder through the cylinder walls to the interior hollow chamber and allow the free passage of water. The lower end portion of the tubular member descends from the underside of the disc 4 and is comprised of an imperforate cylindrical base 2 of predetermined length to correspond with the thickness of the bottom of the pot.

The plant pot drain can be integral with all of its parts as thus described and as such functions as a whole unit of one piece construction. The plant pot drain can be fabricated from an impervious and somewhat rigid material such as rubber, ceramic, polyvinyl chloride and the like.

The perforations 5 in the vertical wall, although large enough to freely allow water to drain radially from the pot, are small enough to prevent any substantial amount of soil from passing therethrough. As indicated there are no perforations in the top of the structure. The tubular member is hollow and open at the base beneath the disc and as such functions as a channel or chamber which allows the excess water in the plant pot to flow through the drain aperture and then out the base.

Figure 4:
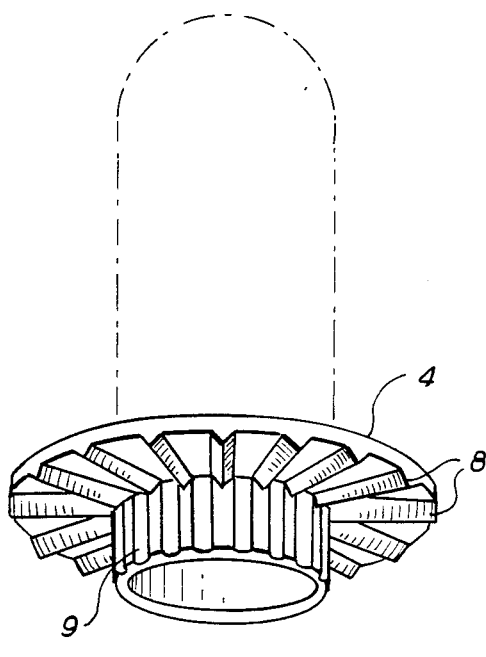
FIG. 4 is a perspective view of one embodiment of the invention.

FIG. 4 shows a different configuration for the plant pot drain of this invention. In this illustration added drainage is obtained by utilizing a flange 4 which has a fluted ridge-like structure 8 disposed on the underside of the flange. This ridge-like structure creates small drains for the water and this excludes the soil and gives added drainage. The base can also have a fluted exterior 9 for the same purpose. A similar structure is shown in FIG. 6 with the ridges formed of rectangular projections 14.

Figure 5:
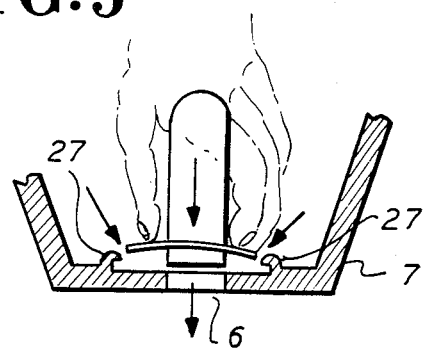
FIG. 5 is a front elevation showing a means for attaching the invention to a pot.

FIG. 5 shows the plant pot drain inserted into a plant pot 7 wherein the plant is specifically designed with two clips 27 on opposite sides of the drain hole to receive the sleeve or disc. The clips 27 are "L" shaped with the base extending in a parallel relation to the bottom of the pot. The distance between the base and the bottom of the pot being supported to accommodate the edge of the flange. The plant pot drain is inserted by applying downward pressure on the sleeve member 4 which flexes the sleeve so that it can be inserted under the retaining clips 27 and held in position.

Another modification of the invention is shown in FIG. 7 wherein the hemispherical member 3 is replaced by a flat disc 16 which intersects the tubular portion horizontally closing the top portion of the cylindrical main body.

A further modification of the invention is shown in FIG. 8 wherein the hemispherical top 17 is separated from the tubular member 18 and is enlarged to occupy an area of greater circumference than the central aperture of the plant pot. The tubular member 18 remains the same circumference as in FIG. 1 and is attached to the inner top of the hemisphere where it serves the purpose of centering the plant pot drain whereas it descends internally, protruding approximately $\frac{1}{4}$ inch below the plane of the hemisphere. The hemisphere 17 in this configuration also serves the same purpose as the disc 4, since the hemisphere 17 rests on the plant pot bottom.

A further modification is shown in FIG. 9 which is similar to FIG. 8 except the hemispherical top is flat and ridges are on the undersurface of the disc 21. These ridges allow water to channel beneath the sleeve portion.

Figure 10:
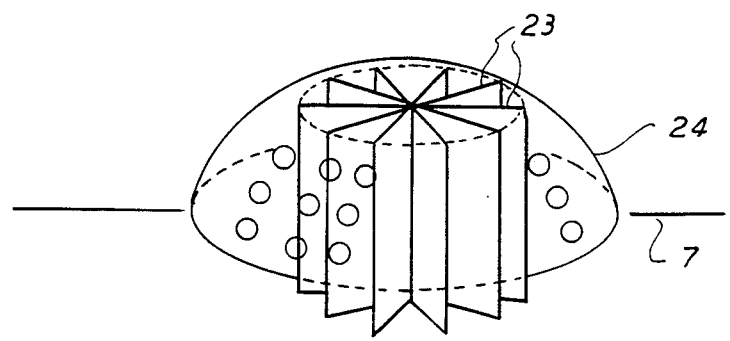
FIG. 10 is a perspective view showing another embodiment of the invention.

Another modification of the invention shown in FIG. 10 which is similar to FIG. 8 except the interior cylinder is replaced with a series of rectangular sections 23 joined together lengthwise along their central axis. The sections 23 are attached to the underside of the hemispherical member 24 and descend internally to protrude below the plant of the hemisphere through the hole in the bottom of the pot.

Figure 11:
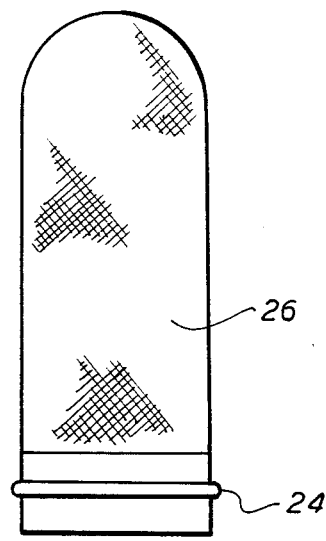
FIGS. 11 and 12 are front and partial cross-sectional views, respectively, of the plant pot drain of the invention incorporating an inner screen and locking device.
Figure 12:
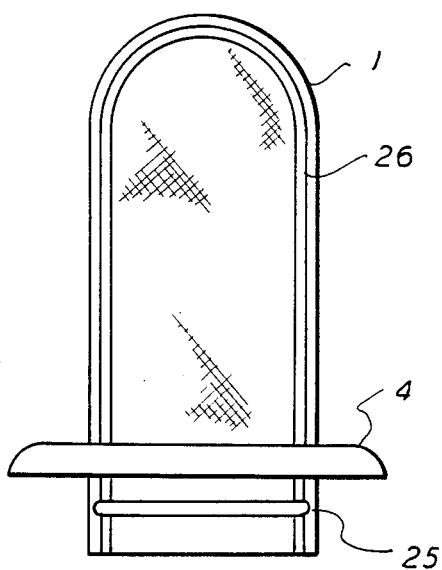

In FIGS. 11 and 12 a modification of the invention is shown wherein the plant pot drain has a screen 26 on its exterior surface. Further, it is provided with a recessed ring section 25 composed of a flexible plastic material 24 which holds the screen in place.

The perforated dimensions of the plant pot drain is approximately 1½ to 2 inches in length. The diameter of the drain is preferably approximately ½ inch to ¾ inch. The sleeve diameter is preferably approximately 1¼ to 1¾ inches. The ratio of the sleeve to the cylinder is approximately 2-3-1. The cylinder walls are preferably formed from plastic of a thickness of from 0.015 to 0.10 inch. The apertures 5 are preferably evenly spaced and approximately 1/32 inch to ⅛ inch in diameter.

While the invention has been described with reference to its preferred embodiments thereof it will be appreciated by those of ordinary skill in the art that various changes can be made in the process and apparatus without departing from the basic spirit and scope of the invention.

What is claimed is:

1. In combination with a plant pot having a base containing a vertical hole extending from the interior surface of the base to the exterior surface of the base, said hole permitting the flow of water out of the plant pot, a potting medium within the pot and a detachable plant pot drain unit comprising:
   a. a cylindrical main body having a hollow interior chamber to allow passage of water, said body extending from the exterior surface of the base through said vertical hole into the pot,
   b. a horizontally extending radial disc affixed to the outer surface of said main body adapted to rest on the interior surface of the base to support the plant pot drain unit and to hold the cylindrical main body in an upright position in said vertical hole, with ridges disposed at the bottom side of the disk for providing channels to guide water for flowing off between the edge of the hole and the outside of the bottom part of the main body extending below the disk,
   c. the cylindrical main body extending above the disc having a multiplicity of small apertures to allow water to pass from the potting medium within the plant pot through said hollow interior chamber and out of said drain hole, said apertures being small enough to prevent the passage of potting medium from the pot and a solid top portion, the weight of the potting medium pressing against said top portion and said disc to hold the pot drain unit in place in the vertical hole.

2. The plant pot drain as defined in claim 1 wherein the ridges are arranged symmetrically on the underside of the disc member and radiate from the central axis of the tubular member and wherein, as the ridges are elevations, the recess formed between them creates channels through which water disposed in the container can flow therefrom.

3. The plant pot drain as set forth in claim 1 wherein the solid member covering the top of the main body is flat.

4. The plant pot drain as set forth in claim 1 wherein the solid member is hemispherical.

5. The plant pot drain of claim 1 wherein the plant pot has a recessed portion circumferentially disposed around the drain hole in the interior of the pot, and said recessed portion is adapted for receiving the disc of the plant pot drain and holding the plant pot drain in position through the force of the edge of the disc against the recessed portion.

6. The plant pot drain as defined in claim 1 wherein a plurality of ridges are on the exterior of the main tubular body extending below the disc for facilitating drainage.

* * * * *